(12) United States Patent
Adams et al.

(10) Patent No.: US 9,563,287 B2
(45) Date of Patent: Feb. 7, 2017

(54) CALIBRATING A DIGITAL STYLUS

(75) Inventors: Guy Adams, Stroud (GB); Andrew Mackenzie, Barcelona (ES)

(73) Assignee: Hewlett-Packard Development Company, L.P., Houston, TX (US)

(*) Notice: Subject to any disclaimer, the term of this patent is extended or adjusted under 35 U.S.C. 154(b) by 1657 days.

(21) Appl. No.: 12/788,469

(22) Filed: May 27, 2010

(65) Prior Publication Data

US 2011/0291998 A1    Dec. 1, 2011

(51) Int. Cl.
G06F 3/033    (2013.01)
G06F 3/0354    (2013.01)
G06F 3/03    (2006.01)

(52) U.S. Cl.
CPC ......... G06F 3/03545 (2013.01); G06F 3/0321 (2013.01)

(58) Field of Classification Search
None
See application file for complete search history.

(56) References Cited

U.S. PATENT DOCUMENTS

| | | | | |
|---|---|---|---|---|
| 5,529,501 A * | 6/1996 | Maruyama | ............... | B43K 8/22 345/179 |
| 5,852,434 A * | 12/1998 | Sekendur | ............ | G06F 3/03545 178/18.01 |
| 7,342,575 B1 * | 3/2008 | Hartwell | ............. | G06F 3/03545 178/19.05 |
| 7,536,051 B2 * | 5/2009 | Lin | ........................ | G06K 9/222 382/181 |
| 7,646,380 B2 * | 1/2010 | Tsang | .................... | G06F 3/0418 178/18.02 |
| 7,656,396 B2 * | 2/2010 | Bosch | ................... | G06F 3/0321 345/156 |
| 2001/0002098 A1 * | 5/2001 | Haanpaa | ................ | B25J 9/1689 318/568.11 |
| 2002/0163511 A1 * | 11/2002 | Sekendur | ............. | G06F 3/0321 345/179 |
| 2004/0008189 A1 * | 1/2004 | Clapper | ............. | G06F 3/03545 345/179 |
| 2006/0022963 A1 * | 2/2006 | Bosch | ................... | G06F 3/0321 345/179 |
| 2007/0040817 A1 * | 2/2007 | Underwood | ........... | B43K 7/005 345/179 |

* cited by examiner

*Primary Examiner* — Seokyun Moon
*Assistant Examiner* — Douglas M Wilson
(74) *Attorney, Agent, or Firm* — HP Inc. Patent Department

(57) ABSTRACT

A method for calibrating a digital stylus comprising imaging a portion of a calibration pattern area of a data encoding pattern using an imaging module of the stylus in order to generate calibration data representing an error in alignment for the stylus, and using the calibration data to adjust subsequent measurements from the stylus in order to compensate for the error.

18 Claims, 6 Drawing Sheets

CALIBRATING A DIGITAL STYLUS

BACKGROUND

A digital stylus, or a digital pen, can be used with specialized paper which encodes position and page information on its surface using a pattern of dots which can be visible and/or invisible to the human eye (in the latter case the encoding can be performed using dots visible only in the infra-red portion of the electromagnetic spectrum). The paper (or similar) surface can be used to record data, in which case the stylus or pen can be used to write on the surface, and the position of the pen can be determined and used to digitize the writing. Alternatively, the stylus or pen can be used in order to select items, such as from a pre-printed form for example. In active systems, such as digital tablets for example, a stylus or pen can be used to control a computing apparatus by virtue of inductive, capacitive or resistive elements in the tablet's surface which are invoked by the stylus thereby causing some action to be performed (such as cursor movement or menu item selection for example).

Digital stylus apparatus can also be used for position determination with a display such as a monitor for example. Accordingly, a display can comprise a data encoding layer which can be used by a stylus to determine position on the monitor thereby enabling a user to control a graphical user interface of a computing apparatus for example.

BRIEF DESCRIPTION OF THE DRAWINGS

For a better understanding of the present invention, and to show more clearly how it may be carried into effect, reference will now be made, by way of example only, to the following drawings in which.

DETAILED DESCRIPTION

Figure 1:
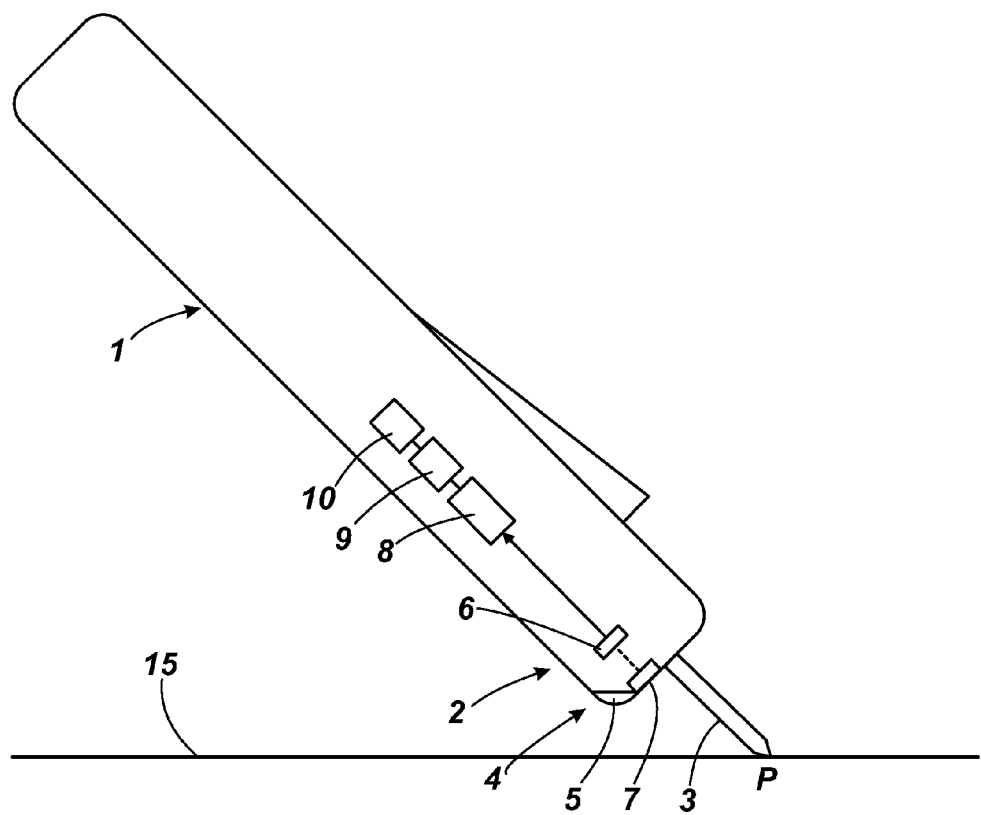
FIG. 1 is a schematic drawing of a stylus.

Reference will now be made in detail to embodiments, examples of which are illustrated in the accompanying drawings. In the following detailed description, numerous specific details are set forth in order to provide a thorough understanding of certain implementations. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first item could be termed a second item, and, similarly, a second item could be termed a first item, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

There is provided a digital stylus for use with an electronic display, such as an LCD for example. In use, the stylus determines its position relative to the display by using a data encoding system present on or in the surface of the display. A portion of the data encoding system is reserved for calibrating the digital stylus using calibration data generated for the stylus. The reserved portion can be a portion from a specific calibration domain of the data encoding pattern, which domain defines a region of the pattern which can be used for the purpose of digital stylus calibration, as opposed to position determination proper. The calibration data represents an offset value to be applied in measurements of position of the stylus on the display made using the data encoding pattern. The calibration data can be generated by the stylus, or can be generated by a computing apparatus associated with the display such that it can be returned to the stylus for later use. For example, an apparatus can comprise a display including a data encoding pattern. A stylus can be used on the display to drive a graphical user interface presented to a user by the display. A reserved portion of the data encoding pattern can be provided within or adjacent to a docking element or indent of the display, within which at least a portion of the stylus can engage with. Calibration data can be generated when the stylus or portion thereof (such as a tip for example) engages with the dock or indent. Alternatively, the stylus can be used to select, using the graphical user interface, that calibration should occur the next time that the stylus is docked.

A digital stylus according to an embodiment is schematically illustrated in FIG. 1. The stylus comprises an elongate body 1 with a writing tip 2 at one end, on which is mounted a writing stylus 3 and a camera 4 set up to image an area of a writing surface adjacent to the tip of the stylus. The camera 4 comprises a light source 5, such as an infra-red light emitting diode LED, an infra-red sensor 6, and a lens system 7 to collect infra-red light reflected from the writing surface and conduct it to the sensor 6. A processor 8 within the body 1 processes image data from the sensor 6. According to an embodiment, a pressure sensor 9 detects contact of the writing stylus with the writing surface and triggers operation of the stylus. Alternatively, the stylus can be continuously operational, in which case the pressure sensor need not be present.

The stylus is adapted for use with a surface having a position-determining pattern encoded thereon, which pattern can comprise a number of dots which encode data representing a notional page and position for the stylus. Dots are generally positioned on or around a regular grid. The grid itself can comprise dots which can be used for perspective distortion determination for example, with data encoding occurring in interstitial regions of the grid. However, a stylus system according to an embodiment is adapted for use with any other suitable data encoding pattern. The dots do not generally have a presence to the eye by virtue of the fact that they are not visible to humans in normal use. Alternatively, data encoding representing a page and position for the stylus can be provided using another optical technology. For example, the surface can be provided with a pattern in which data is encoded using a series of reflective micro prisms. Accordingly, the stylus can determine the data encoding pattern embodied by the prisms by detecting the reflected pattern imaged using camera 4. In this connection, an IR LED can be used to illuminate the prisms. Alternatively, another region of the spectrum can be used for illumination, including visible light. For the sake of clarity, and to avoid unnecessarily obscuring the embodiments described, reference will generally be made herein to the provision of a pattern of data encoding dots, although it should be appreciated that other methods of encoding data for a surface are applicable to the system as described, such as that using micro-prisms for example.

Accordingly, when the stylus is in use, the processor 8 processes the image of dots which it receives from the sensor 6, and determines the corresponding position of the writing stylus on the surface. The position information can be stored in a memory 10 within the pen body and is used together with successive determinations of writing stylus position in order to determine the shape and position of any strokes, position changes or marks made by the writing stylus of the stylus. Alternatively, in use, data can be dynamically provided to a host device so that an instantaneous stylus position can be provided. The data can be provided over a wired or wireless link such as a radio-frequency wireless communications channel for example. Alternatively, an instantaneous data link can be established using a line of sight technology, such as an infra-red or other optical link for example.

During shipping and use for example the stylus can be subjected to shocks, vibrations, wear (of the tip at least) and expansion/contraction due to temperature changes. In particular, events such as the stylus being dropped may cause shifts in the relative positions of the components described above. Furthermore, storage in bags or being sat on while in pockets may cause bending or twisting that disturbs the original alignment and geometry of the elements in the system. Changes in the alignment of the lens, other optical elements, sensor, stylus tip length and other mechanical relationships can all affect the accuracy of the stylus, thereby affecting its ability to accurately reflect a user's desired selection. Errors can also be introduced as a result of misalignment of a data encoding pattern on a surface. Accordingly, accurate re-calibration of the stylus tip position when used with a display is required.

Figure 2:
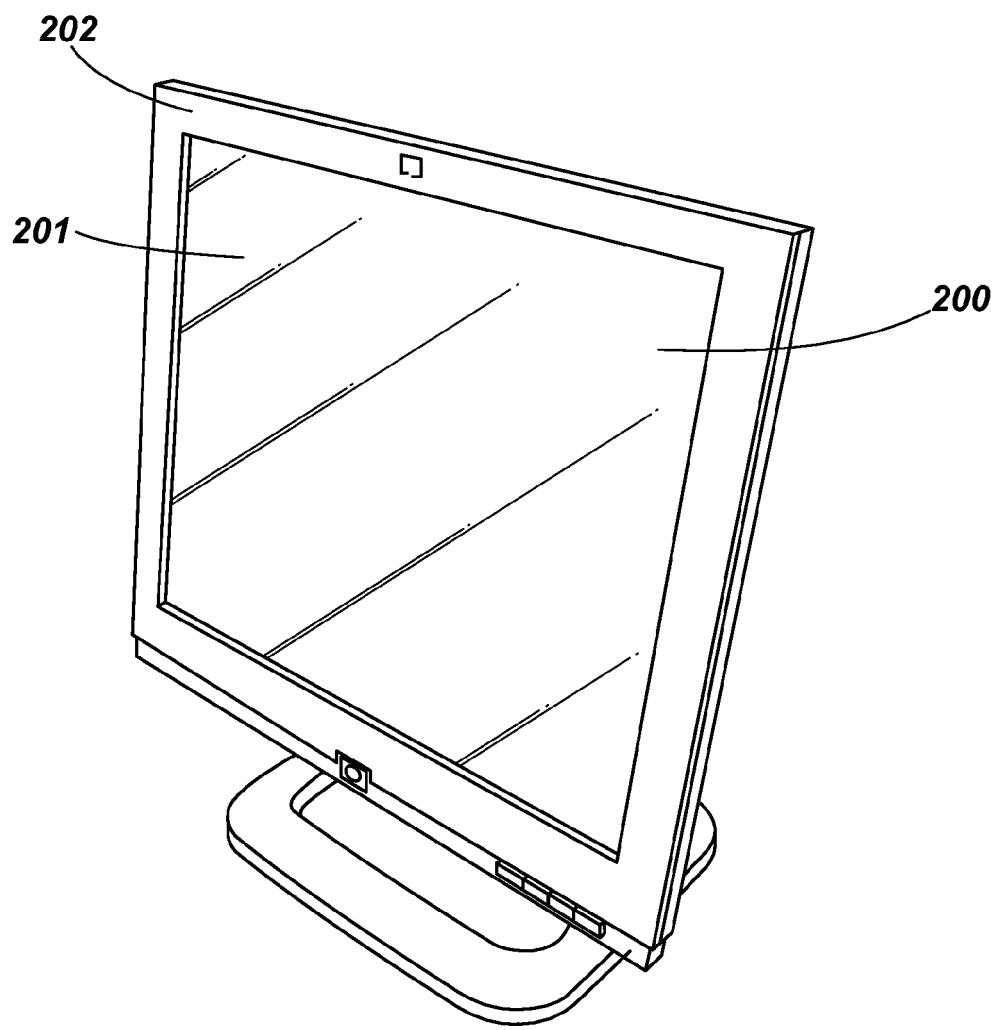
FIG. 2 is a schematic drawing of a display surface suitable for use with the stylus of FIG. 1.

FIG. 2 is a schematic drawing of a display 200 suitable for use with the stylus of FIG. 1. A display surface 201 is operable to present information to a user. The display can be embodied in, for example: a computer monitor, television, instrument panel, signage, or as a display on a: video player, gaming device, clock, watch, calculator, or telephone etc. Other alternatives are also possible, as will be appreciated. Display surface 201 of display 200 can be an LCD for example. According to an embodiment, the display surface comprises an encoded pattern which is in the form of a pattern of dots such as that described above, although it will be appreciated that alternative forms of encoding position data in the form of dot positions can be used. The encoding pattern can be applied to the display surface in a number of ways. For example, it can be built into an LCD stack, or can be a film, which can be removable, and which is applied directly to the display surface by the manufacturer or an end user. The encoding pattern, whether applied directly into the display or applied as a film, can comprise dots printed in IR ink for example, which is invisible to humans, or can be formed from a pattern of reflective micro-prisms, or other suitable optical mechanism. The encoding pattern should not significantly affect the brightness, contrast or colour rendition of any information being presented to a user.

According to an embodiment, the display 200 has an additional area of encoding pattern on or within a bezel region 202, or other suitable area such as on a stand for example, which can be stand alone or a stand onto which the display is mounted. An area of the pattern is reserved for this use as a calibration pattern area. Adjacent to the calibration pattern area is a dock shaped to accommodate at least the stylus writing tip. Another suitable fitting for releasably fixing or docking the stylus so that the calibration pattern area can be imaged by the stylus can be used. In order to re-calibrate the stylus, the user places the stylus into this hole, indent, dock or fitting, and presses the stylus so that pressure is registered by the pressure sensor of the stylus. Alternatively, if the stylus is continuously operable, no pressure need be applied, and the imaging of the calibration area can commence as soon as the stylus is within imaging range thereof. The stylus captures images of the patterned area and thus calculates its position using the position data encoded by the calibration pattern area in order to generate data suitable for calibrating the position recorded by the stylus in later use. The pattern area may completely surround the dock so that the stylus may be placed with any arbitrary rotation about its longitudinal axis.

The dock used to house the stylus when calibrating can be positioned on a bezel portion of the display. The dock can accommodate substantially just the writing tip or writing stylus of the stylus, or can be arranged to also accommodate a portion of the body of the stylus. In either case, the dock can be adapted to house the tip or body in a limited number of orientations. According to an embodiment, the stylus or tip engages with the dock at a predetermined angle so that the effects of perspective distortion when imaging the calibration area can be accommodated and corrected for. The angle if incidence of the tip or body portion can be an suitable angle within a range which allows a user to simply and repeatably engage the tip or stylus with the dock. The tip or stylus can be engaged with the dock substantially perpendicularly, or at any other suitable angle such as 60° or 45° for example.

The dock can be arranged to accommodate the tip or body portion in only one rotational orientation, or it can be arranged to allow the tip or body portion to fit when the stylus is presented to it in any such orientation. For the former, the shape of the dock can be adapted to match the shape of the tip or body portion in the case that the tip or body is not symmetric in the region at which it engages with the dock. If the stylus or tip is symmetric, it can be provided with a engaging male (or female) portion which is adapted to match a corresponding female (or male) portion of the dock such that only one rotational orientation of the tip or stylus will allow it to be accommodated correctly in the dock.

According to an embodiment, the stylus can be preprogrammed with the nominal position of the dock/fitting within the patterned area. By using the patterned area to calculate its position and rotation, the stylus can thus calculate the dock position, which will include an actual error in the position information determined by the stylus. By comparing this position to that of the dock's nominal position, data representing the current position error of the stylus can be calculated and stored in memory. The error can then be used in order to determine a position correction factor in the form of calibration data which can be applied to succeeding position calculations thereby increasing the accuracy of the stylus in subsequent uses following calibration.

There are degrees of error that can be determined depending on the scheme used for calibration. For example, if the stylus is vertically (relative to the pattern area) docked, and rotation of the stylus is not constrained, it is possible to determine translation errors in x and y directions, local optical rotation errors (from grid lines of the data encoding pattern), vertical angular errors (from perspective distortion), and errors relating to stylus length (from scale). If the stylus is vertically docked, and rotation of the stylus is constrained, this provides more vertical angular accuracy, and allows the detection of global rotational errors. A docking scheme in which the stylus is vertically docked, and then tilted, a measurement being taken in each instance allows the detection of errors in length to a greater degree of accuracy. As described below, there is also an alternative scheme for accurate length error detection.

Figure 3:
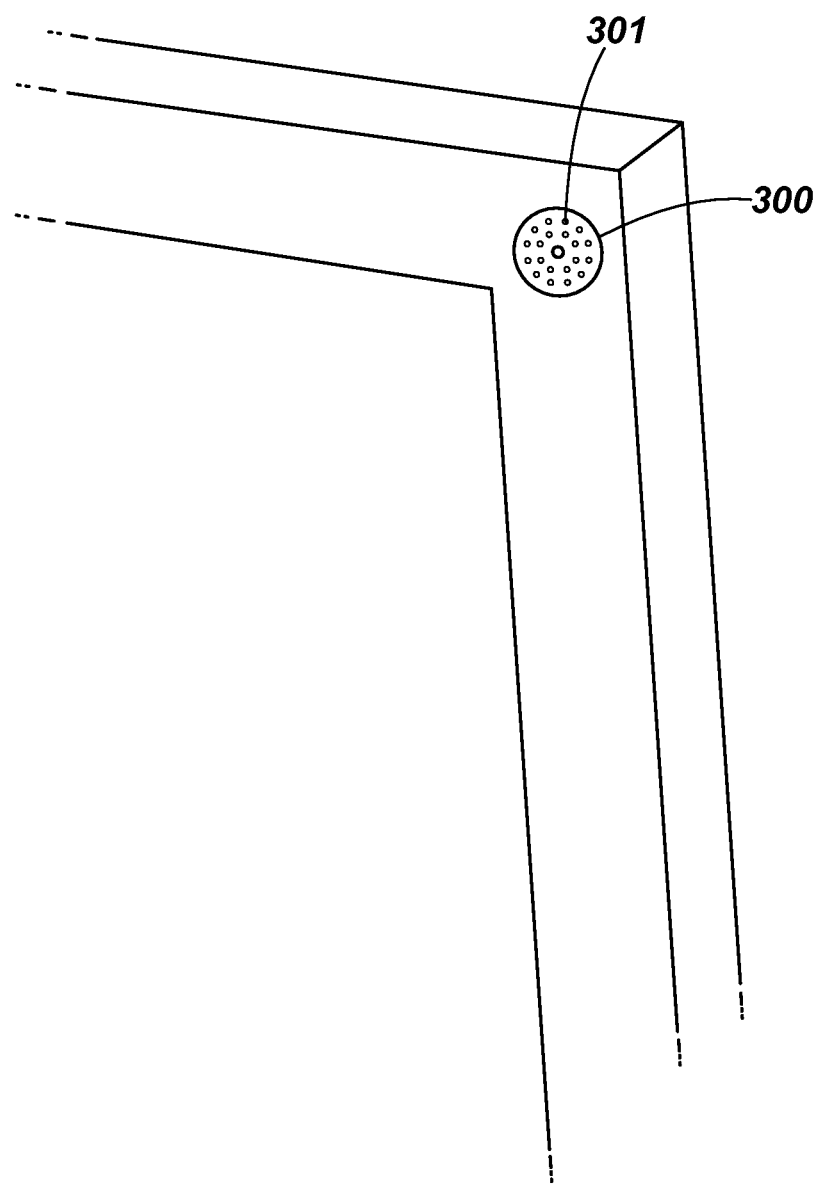
FIG. 3 is a schematic drawing of a dock suitable for use with a display and stylus.

FIG. 3 is a schematic drawing of a dock suitable for use with display 200 and stylus of FIG. 1. The dock 300 takes the form of an indent suitably shaped to receive at least the writing tip of a stylus in such a manner so as to minimize the amount of movement of the stylus when it is engaged in the indent. By ensuring that the indent is a good fit for the stylus results in a more accurate measurement of the pattern area 301. Accordingly, calibration data can be relied upon to be accurate since the stylus is unable to give a spurious reading relating to the position of the dock. The dock is an indent suitable for temporarily receiving the stylus.

Indent 300 acts as a guide for the stylus to enable the accurate imaging of the patterned area 301. According to an alternative embodiment, a dock can be an indent which is designed to hold the stylus for a prolonged period, such as when it is not in use for example, thereby also acting as storage for the stylus. In this connection, the dock can be an indent which is adapted to accommodate the stylus for a prolonged period and which minimizes the risk of it falling out, or can comprise a fitting attached to the display which can be a releasable fitting, such that it can be removed from the display when not required, or which can be a permanent fixture on the display. In either alternative, the stylus is releasably fixable to the fitting to enable a user to be able to remove the stylus as required. Alternatively, the display and the calibration area can be used for calibration either with a docking point close to the edge of the bezel that allows the pen to image the surface of the screen, or by means of a detent in the surface of the screen, such as one near the corner, for example.

According to an alternative implementation, a dock can comprise a female mating portion adapted to receive a corresponding portion of the body of the stylus. The respective portions can further comprise a channel and corresponding nub adapted to align the body in the mating portion so that the body can only be received therein in one particular orientation.

In the case of a releasably fixable dock element on the display, the stylus can be adapted to generate calibration data and therefore calibrate its position each time it is docked. Alternatively, a user can select when to perform calibration, such as by performing a hardware or software invocation. For example, the user can use the display and stylus to control a user interface which enables the selection of a calibration procedure. By selecting that calibration be performed, the stylus can generate calibration data the next time it is docked. Alternatively, the calibration pattern area can comprise data which is recognized by the stylus so as to cause it to initiate calibration any time that the stylus is engaged with the dock. Specifically, since the calibration pattern area comprises data which is reserved for that purpose, upon imaging that pattern, the stylus can automatically default to performing calibration. Calibration can also be triggered by a specific sequence of actions generated by the user e.g. pen near vertical, then rotate the pen clockwise 90 degrees.

Figure 4:
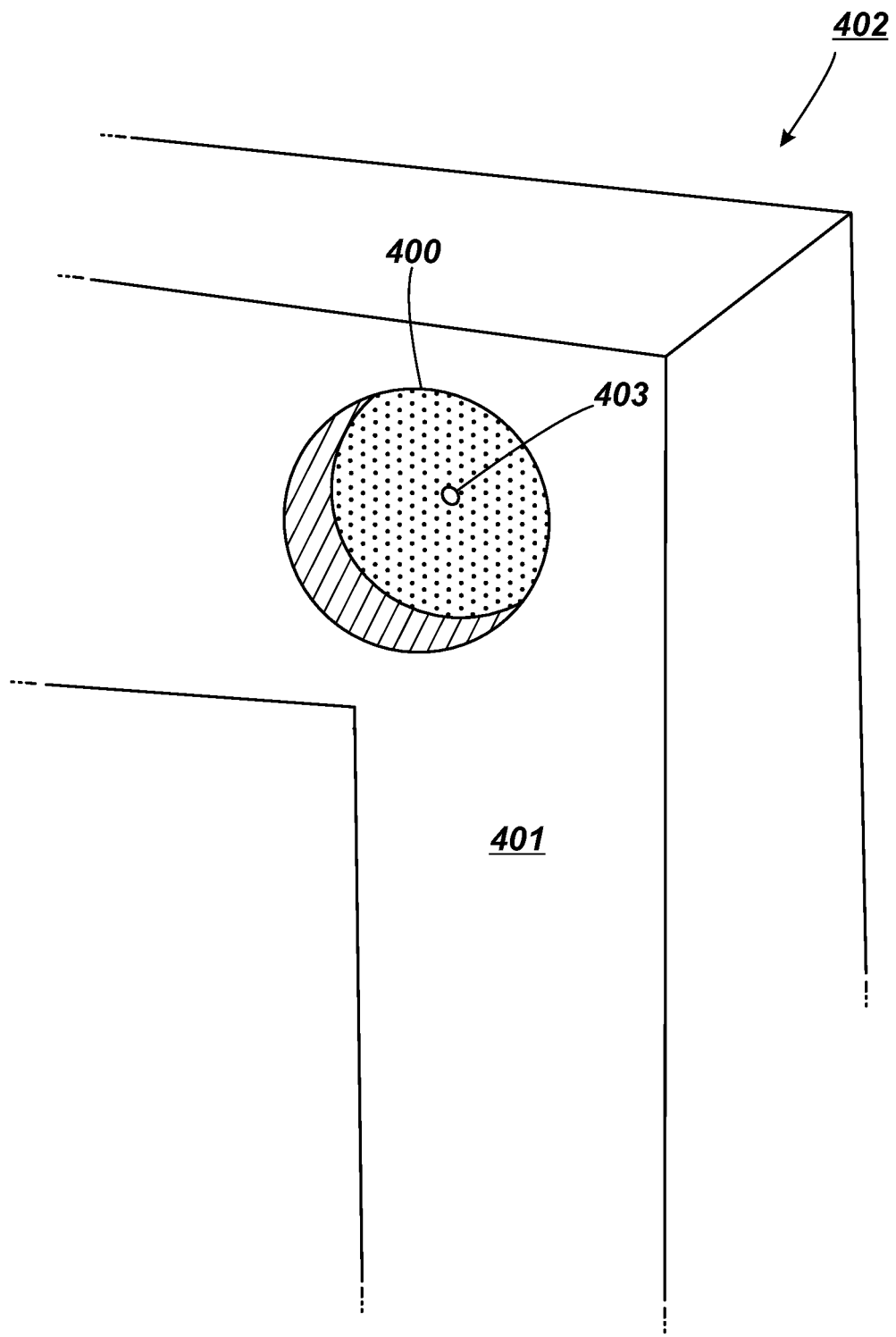
FIG. 4 is a schematic drawing of a dock suitable for use with a display and stylus.

FIG. 4 is a schematic drawing of a dock suitable for use with a display and stylus. The dock 400 comprises an indent in the bezel 401 of the display 402. The indent is shaped to accommodate a stylus, that is to say the dock can have a specific shape which is adapted to receive a portion of the body of a stylus which is asymmetric or symmetric. In the latter case, the indent can be provided with means (not shown) to guide the body into a particular orientation when docking. When in the dock, the stylus camera will image a portion of a calibration pattern area provided inside the dock in order to generate calibration data.

In order to accommodate the provision of errors arising from the fact that the stylus tip may have shifted from its manufactured position, the dock 400 can comprise a tip receptacle 403 arranged to receive the tip of the stylus. According to an embodiment, the receptacle 403 can be 'floating' so that a misaligned stylus tip can still be accommodated by it even in the case where it otherwise would not fit if the receptacle were fixed. More specifically, upon engaging the stylus with the dock, the receptacle can be arranged to move into position underneath the tip as a result of a force applied by the tip engaging with the receptacle. The calibration pattern area can be arranged to move in unison with the receptacle so that the same portion is always imaged by the stylus.

Figure 5A:
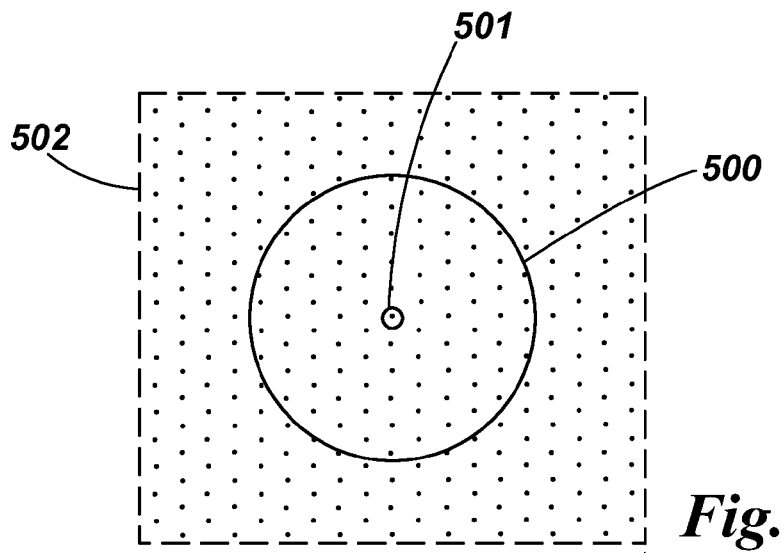
FIGS. 5*a-c* are schematic diagrams of a floating dock receptacle.
Figure 5B:
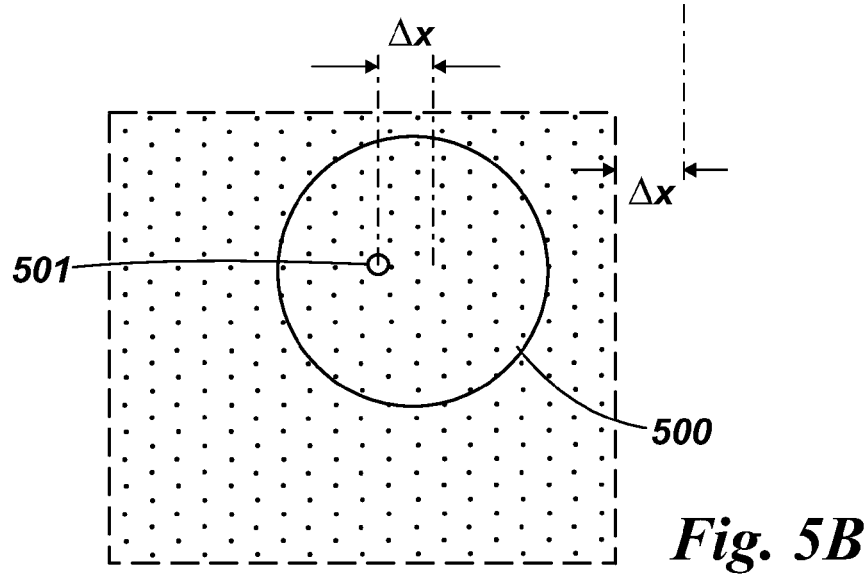
Figure 5C:
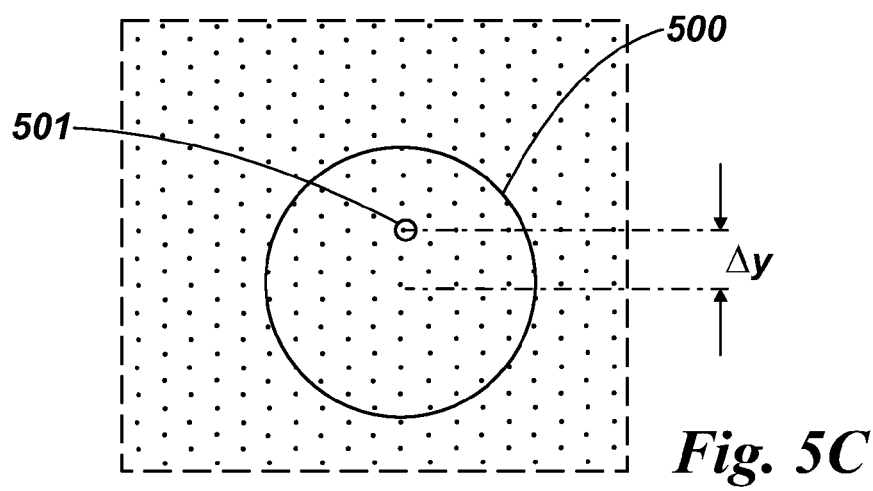

FIGS. 5a-c are schematic diagrams of a floating dock receptacle according to an embodiment. FIG. 5a shows the dock receptacle 501 of dock 500 in a first position in which the receptacle 501 is at rest—that is to say, the receptacle is not experiencing any force from a stylus tip which would cause it to move. Box 502 illustrates a notional area for the calibration pattern area. Only the portion of the pattern within the dock 500 will be visible to a stylus. However, in order to accommodate movement of the area if it moves in unison with receptacle 501, it must overlap the dock 500 by a sufficient amount.

FIG. 5b illustrates how the receptacle and underlying calibration pattern area have moved by an amount $\Delta x$ from the 'resting' position of the receptacle. The calibration pattern area 502 has also moved by a corresponding amount. FIG. 5c illustrates a similar example, in which receptacle 501 and pattern area 502 have moved from rest by $\Delta y$. In normal use, it is expected that the movement would occur in more than one dimension, and so the receptacle and pattern area would shift by an amount of the form $\Delta x + \Delta y$.

Figure 6A:
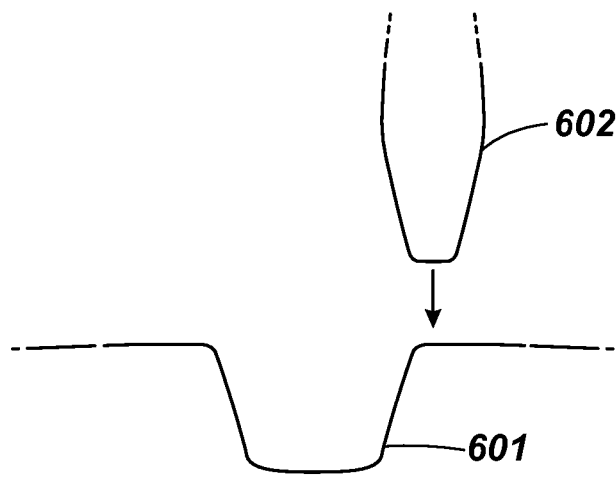
FIGS. 6*a-c* are schematic diagrams of a receptacle being shifted by stylus tip.
Figure 6B:
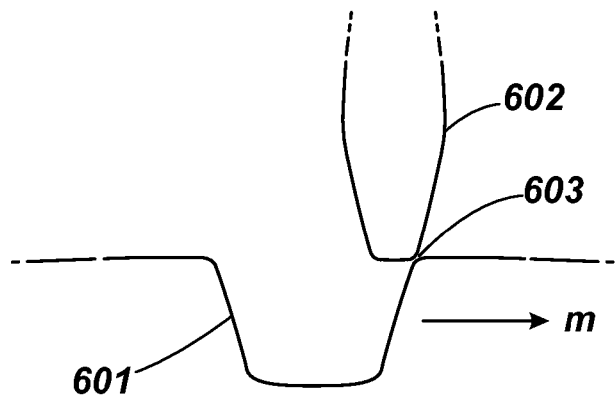
Figure 6C:
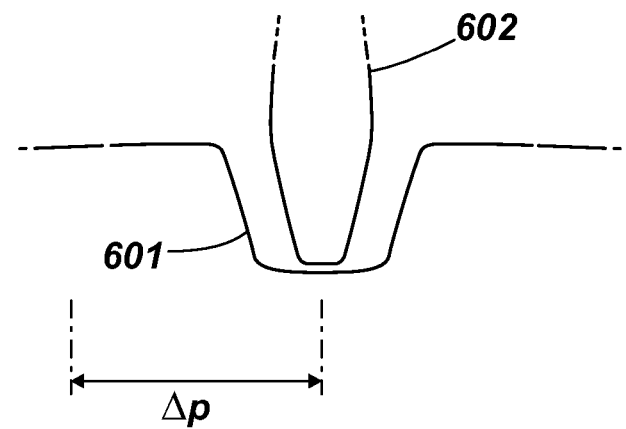

FIG. 6a-c are schematic diagrams of an exemplary receptacle being shifted by an engaging stylus tip, which tip is misaligned from its correct position. In FIG. 6a, a receptacle 601 (side-view) is at rest. A stylus tip 602 is to be engaged with the receptacle as indicated by the arrow showing the direction of travel of the tip 602 relative to the receptacle. In FIG. 6b, tip 602 makes contact with receptacle 601 at point 603. As further downward force is applied to the tip, it causes the floating receptacle to shift from its rest position in the direction M. Note that receptacle 601 is prevented from moving in the same (downward in the sense of FIG. 6b) direction as the tip so that the pressure exerted by tip 602 causes it to move in orthogonally. In FIG. 6c the tip 602 has come to rest in a docked position in receptacle 601. The receptacle has shifted by an amount Δp. The shift corresponds to a physical misalignment of the tip.

In order to be able to detect changes in stylus length, the dock can be adapted to cause a variation in the angle (automatically or manually) of the surface with the coded pattern using a solenoid/micro-motor or manual mechanism for example. In an automatic system, a first calibration measurement can be made when the stylus is docked, followed by a second measurement. For one of the measurements, the calibration pattern area can be shifted in angle relative to the angle for the first measurement. In a manual system, the pattern area can be provided with an additional angled region. When docked, the user can tilt the stylus so that both a flat and angled region of the pattern area are imaged. The provision of a measurement taken using an angled portion of the pattern area provides the information necessary for determining a change in the length of the stylus.

If there is a parallax error due to the coded pattern dots not being on the surface then this can also be corrected by calibration, either by the dock replicating the parallax elements or by a pre-determined error being added to the calibration process. If the stylus has been calibrated for use on a surface with parallax error then, depending on use models, there can be a facility for calibrating for use on paper. For example, the stylus can automatically recalibrate as soon as it determines that it is imaging a pattern portion which is not part of the display pattern. More specifically, since a finite region of data encoding pattern is used for a display, use of the digital pen on any other 'page' can result in a calibration being performed in order to accommodate the use off-screen. Similarly, when moving back to display use, the page ID of the pattern for the screen can be recognized, and the stylus calibrated accordingly.

What is claimed is:

1. A method for calibrating a digital stylus comprising:
   imaging a portion of a calibration pattern area of a data encoding pattern using an imaging module of the stylus in order to generate calibration data representing an error in physical alignment of the stylus, wherein imaging a portion of the calibration pattern area further comprises:
      engaging at least a writing tip of the stylus with a corresponding receptacle of a dock in order to releasably fix the stylus in a calibration position; and
   using the calibration data to adjust subsequent measurements from the stylus in order to compensate for the error.

2. A method as claimed in claim 1, where the data encoding pattern is formed from a plurality of optically reflective elements.

3. A method as claimed in claim 1, wherein the calibration pattern area is a reserved portion of the data encoding pattern.

4. A method as claimed in claim 3, wherein the reserved portion is a portion from a calibration domain of the data encoding pattern, wherein the calibration domain defines a region of the data encoding pattern which can be used for the purpose of digital stylus calibration.

5. A method as claimed in claim 1, wherein the data encoding pattern is a pattern of dots embodied on a transparent layer and responsive to illumination under infra-red light, and wherein imaging the portion of the calibration pattern area further comprises:
   using an infra-red light source of the stylus, illuminating the portion of the calibration pattern area; and
   imaging reflected light from the illuminated portion of the pattern area using a sensor of the stylus in order to generate pattern data representing the pattern of dots embodied by at least the portion of the calibration pattern area.

6. A method as claimed in claim 1, wherein the calibration pattern area is accommodated within or adjacent to the dock such that the stylus images the portion of the calibration pattern area when engaged therewith.

7. A method as claimed in claim 1, further comprising:
   using the calibration data, correcting an error in alignment of a tip of the stylus by providing an offset value for shifting a measurement of position determined by the stylus using the data encoding pattern.

8. A method as claimed in claim 1, wherein the calibration pattern area comprises a plurality of regions at respective different angular orientations relative to the imaging module and arranged to provide a variable calibration offset for the stylus for determining a change in the length of a writing tip of the stylus.

9. A method as claimed in claim 1, further comprising:
   using the data encoding pattern to determine the type of surface on which the data encoding pattern is provided; and
   on the basis of the determining, adjusting a calibration setting of the stylus to accommodate use of the stylus on the determined type of surface.

10. Apparatus comprising:
    a display;
    a data encoding pattern embodied within or on a region of a surface of the display, the data encoding pattern comprising a calibration portion reserved from a calibration domain of the data encoding pattern for correcting an error in physical alignment of a digital stylus for use with the apparatus; and
    a dock to receive a portion of the digital stylus to fix a position of the digital stylus with respect to the calibration portion, wherein the calibration portion is to be imaged by the digital stylus while the digital stylus is in the dock.

11. The apparatus as claimed in claim 10, further comprising the digital stylus to generate calibration data based on imaging the calibration portion while the digital stylus is in the dock, the calibration data representing an offset to be applied to measurements of position of the digital stylus made using the data encoding pattern.

12. The apparatus as claimed in claim 10, wherein the calibration portion of the data encoding pattern is adjacent to or within the dock such that an imaging element of the stylus images the calibration portion when engaged with the dock.

13. The apparatus as claimed in claim 10, wherein the portion of the stylus comprises at least a tip of the digital stylus.

14. The apparatus as claimed in claim 13, wherein the dock comprises an indent suitable for receiving the tip of the digital stylus.

15. The apparatus as claimed in claim 11, wherein the calibration data is provided by the digital stylus to the apparatus using a wired or wireless data communication link.

16. The apparatus as claimed in claim 10, wherein the calibration portion is imaged automatically upon engagement of the digital stylus with the dock.

17. The method as claimed in claim 1, wherein imaging the portion of the calibration pattern area is performed while the stylus is fixed in the calibration position by the dock.

18. The apparatus as claimed in claim 11, wherein the digital stylus is to image the calibration portion while the digital stylus is fixed in a calibration position with respect to the calibration portion by the dock.

* * * * *